United States Patent [19]

Matsuura et al.

[11] Patent Number: 4,587,936
[45] Date of Patent: May 13, 1986

[54] CONTROL APPARATUS FOR INTAKE AND EXHAUST VALVES OF AN INTERNAL COMBUSTION ENGINE

[75] Inventors: Masaaki Matsuura, Tokyo; Yoshikatsu Nakano, Saitama, both of Japan

[73] Assignee: Honda Giken Kogyo Kabushiki Kaisha, Tokyo, Japan

[21] Appl. No.: 416,326

[22] Filed: Sep. 9, 1982

[30] Foreign Application Priority Data

| Sep. 10, 1981 | [JP] | Japan | 56-141712 |
| Sep. 10, 1981 | [JP] | Japan | 56-141713 |
| Sep. 10, 1981 | [JP] | Japan | 56-141715 |
| Sep. 24, 1981 | [JP] | Japan | 56-149627 |
| Sep. 24, 1981 | [JP] | Japan | 56-150920 |

[51] Int. Cl.[4] .................................................. F01L 9/02
[52] U.S. Cl. .................................... 123/315; 123/432; 123/90.12; 123/90.46
[58] Field of Search ............ 123/90.15, 90.16, 198 F, 123/308, 315, 432, 321, 323, 90.1, 90.12, 90.42, 90.46

[56] References Cited

U.S. PATENT DOCUMENTS

| 1,849,149 | 3/1932 | Monroe | 123/315 |
| 1,896,163 | 2/1933 | Champion | 123/315 |
| 2,262,265 | 11/1941 | Anderson | 123/315 |
| 2,817,322 | 12/1957 | Miller | 123/316 |
| 3,139,870 | 7/1964 | Sampietro | 123/90.4 |
| 3,234,924 | 2/1966 | May | 123/323 |
| 3,334,618 | 8/1967 | Funiciello | 123/315 |
| 3,507,261 | 4/1970 | Myers et al. | 123/90.15 |
| 3,520,287 | 7/1970 | Calvin | 123/321 |
| 4,050,435 | 9/1977 | Fuller, Jr. et al. | 123/198 F |
| 4,188,933 | 2/1980 | Iizuka | 123/198 F |
| 4,224,920 | 9/1980 | Sugasawa et al. | 123/198 F |
| 4,258,671 | 3/1981 | Takizawa et al. | 123/90.16 |
| 4,285,310 | 8/1981 | Takizawa et al. | 123/308 |
| 4,333,430 | 6/1982 | Rosquist | 123/323 |
| 4,343,268 | 8/1982 | Stang et al. | 123/315 |
| 4,378,765 | 4/1983 | Abermeth et al. | 123/321 |

FOREIGN PATENT DOCUMENTS

| 0026249 | 4/1981 | European Pat. off. | |
| 0034681 | 9/1981 | European Pat. Off. | |
| 2942033 | 5/1981 | Fed. Rep. of Germany | |
| 0057009 | 5/1979 | Japan | 123/198 F |
| 0051907 | 4/1980 | Japan | 123/90.44 |
| 0072621 | 5/1980 | Japan | 123/198 F |

Primary Examiner—Craig R. Feinberg
Assistant Examiner—David A. Okonsky
Attorney, Agent, or Firm—Lyon & Lyon

[57] ABSTRACT

An internal combustion piston engine having a plurality of intake valves and a plurality of exhaust valves per cylinder employs apparatus for disabling the operation of at least one exhaust valve upon decrease in speed of the engine below a predetermined level.

10 Claims, 18 Drawing Figures

CONTROL APPARATUS FOR INTAKE AND EXHAUST VALVES OF AN INTERNAL COMBUSTION ENGINE

This invention relates to control apparatus for the intake and exhaust valves of a four cycle internal combustion engine, which engine has at least one intake valve and a plurality of exhaust valves for each cylinder. The function of the control apparatus is to maintain at least one exhaust valve in closed position during a certain operating condition of the engine, for example, idling or low speed operation.

In four cycle internal combustion engines it has been known that, by lengthening the valve overlap time, that is, time during which an intake valve and an exhaust valve are simultaneously opened, an intake-exhaust inertia effect is utilized for higher power output. This inertia effect is produced satisfactorily in the range of high speed operation, but in the range of low speed operation or in the range of low load operation, it is not possible to provide mixture flow with adequate velocity, because the absolute quantity of mixture intake reduces. Consequently, exhaust gas circulation flow develops to cause deterioration of combustion, which may result in decreased low speed power output.

Also, when one of the intake valves and one of the exhaust valves are positioned to face each other, mixture flows when they are maintained in closed position, and this is likely to produce an undesirable deviated flow in the combustion chamber.

An important object of this invention is to provide valve control apparatus which is free from the foregoing disadvantages, and which is useful in an engine of the type providing one cylinder with at least one intake valve and with at least two exhaust valves, by enabling at least one of the exhaust valves to change between operative and inoperative conditions, respectively, according to the operating condition of the engine.

It is also an object of this invention to provide improved means for actuating the valve control apparatus, including means for measuring the rate of flow of intake air, as well as measuring the RPM of the engine.

Other and more detailed objects and advantages will appear hereinafter.

Figure 1:
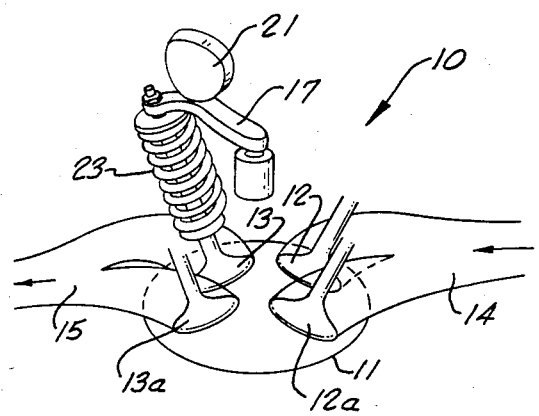
FIG. 1 is a diagrammatic perspective view showing a preferred embodiment of this invention.
Figure 2:
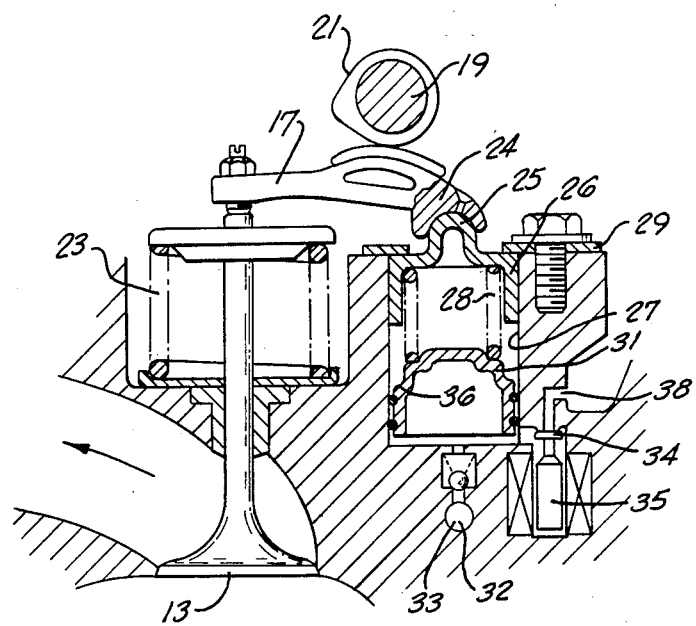
FIG. 2 is a sectional elevation, partly broken away.
Figure 3:
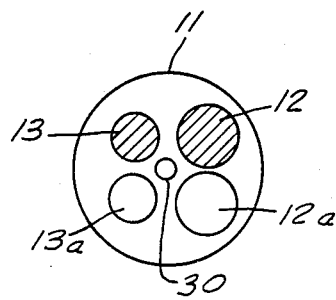
FIG. 3 is a top plan view in diagrammatic form.

Referring to FIGS. 1-3 of the drawings, the internal combustion engine generally designated 10 has one or more cylinders 11 each provided with two intake valves 12 and 12a and two exhaust valves 13 and 13a. The intake valves control admission of an air-fuel mixture through the intake pipes 14 into the cylinder 11. Similarly, the exhaust valves control discharge of exhaust gases from the cylinder 11 through the exhaust pipes 15. A rocker arm 17 is provided for the exhaust valve 13. A cam lobe 21 on a rotary cam shaft 19 contacts an upper surface of the rocker arm 17. Springs 23 act to close the exhaust valves 13 and 13a.

In accordance with this invention, control means are provided for disabling the opening action of one of the exhaust valves. As shown in FIG. 2, the rocker arm 17 is provided with a fulcrum cup 24 which engages the rounded projection 25 on a piston 26 slidably mounted in the cavity 27. A relatively weak spring 28 acts in a direction to hold the piston 26 in contact with the stop collar 29. A spark plug 30 is provided centrally of the cylinder 11.

A hydraulic piston 31 is sealed for axial sliding movement within the cavity 27 and receives hydraulic fluid from a supply passage 32 through a check valve 33. A control valve 34 is operated by an electric solenoid 35. When the solenoid 35 is actuated electrically to close the control valve 34, hydraulic pressure from the supply passage 32 drives the hydraulic piston 31 in a direction to compress the weak spring 28 and to bring the annular shoulder 36 into contact with the lower end of the skirt 37 of the piston 26, thereby preventing movement of the rounded projection 25. Accordingly, when the cam lobe 21 moves to depress the rocker arm 17, the exhaust valve 13 is moved into open position against the action of the spring 23. However, when the solenoid 35 is actuated to move the control valve 34 to open position, hydraulic fluid within the piston 31 and downstream of the check valve 33 is discharged through the open control valve 34 into discharge passage 38. The next time the cam lobe 18 depresses the rocker arm 16, the piston 26 moves downward to compress the weak spring 28 and to discharge hydraulic fluid through the open control valve 34, the spring 23 holding the exhaust valve 13 in closed position.

Figure 4:
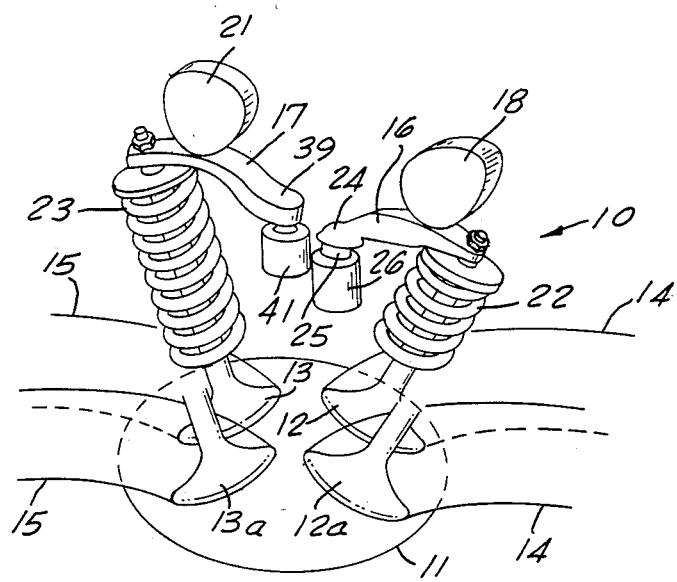
FIG. 4 is a perspective view similar to FIG. 1 but showing a similar mechanism for an intake valve.
Figure 5:
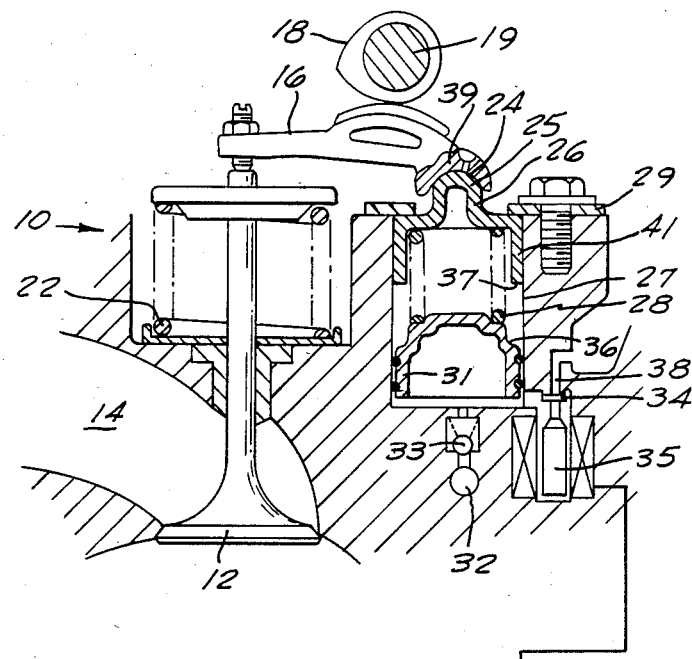
FIG. 5 is a sectional elevation, partly broken away, relating to FIG. 4.
Figure 5:
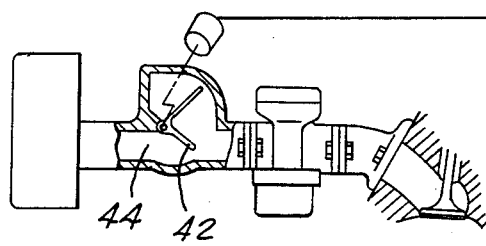

As shown in FIGS. 4 and 5, duplicate mechanism may be provided for controlling the action of the rocker arm 16 for operation of the intake valve 12. One end of the rocker arm 16 operates the intake valve 12 and the other end 39 operates against a piston 41. The piston 41 is provided with similar and duplicate mechanism, as shown by similarly numbered parts in FIGS. 1 and 2, for disabling the opening of the intake valve 12. Accordingly, when the solenoid operated control valve 34 is closed, the intake valve 12 is open and closed against the action of the spring 22 by means of the rotating cam lobe 18. When such control valve 34 is opened, the intake valve 12 remains closed and the piston 41 remains in depressed position.

The intake valve 12a and the exhaust valve 13a are operated from the cam shafts in the conventional manner and do not have the control mechanism as shown in FIGS. 3 and 4. Only these two valves 12a and 13a operate when the engine is turning at a relatively slow speed.

All four valves as shown in FIGS. 1-5 operate when the engine turns at a relatively high speed.

The rate of intake of air into the engine is employed as a detection signal to determine whether all four valves operate or whether only a fewer number operate. A flow meter 42 is placed in an intake passage 44 of the engine and its angular position together with control means 43 are used to control operation of the electric solenoid 35. If desired, either one of these controls can be used independently.

Figure 6:
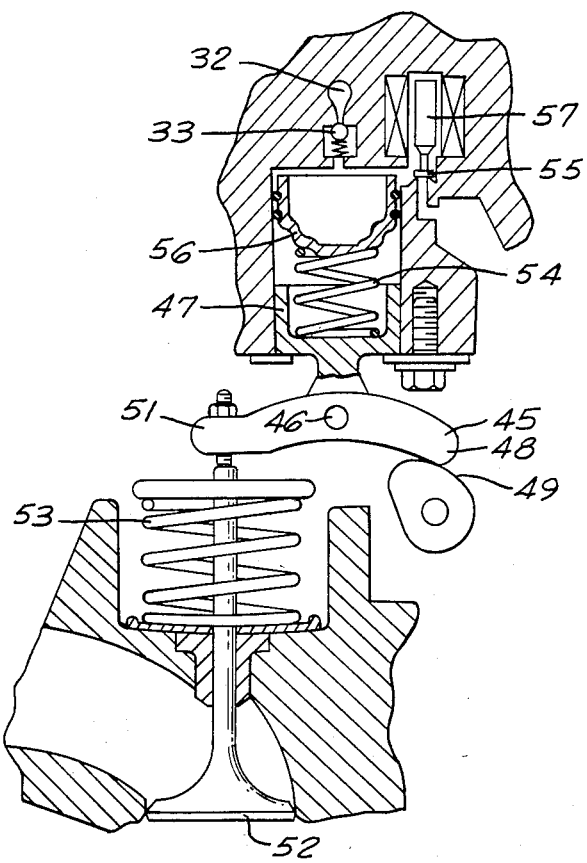
FIG. 6 is a sectional side elevation showing a modification.

The modified form of the control apparatus shown in FIG. 6 employs a rocker arm 45 connected by fulcrum pin 46 to the sliding piston 47. One end 48 of the rocker arm 45 is contacted by the cam lobe 49 and the other end 51 is connected to operate the valve 52 against the action of the spring 53. When the solenoid 57 is retracted to open the control valve 55, hydraulic pressure is bled out of the interior of the hydraulic piston 56 and thereafter oscillations of the rocker arm 45 serve only to move the piston 47 back and forth against the weak spring 54, and the valve 52 remains closed. This construction may be used for either one of the intake valves or either one of the exhaust valves of the engine cylinder.

Figure 7:
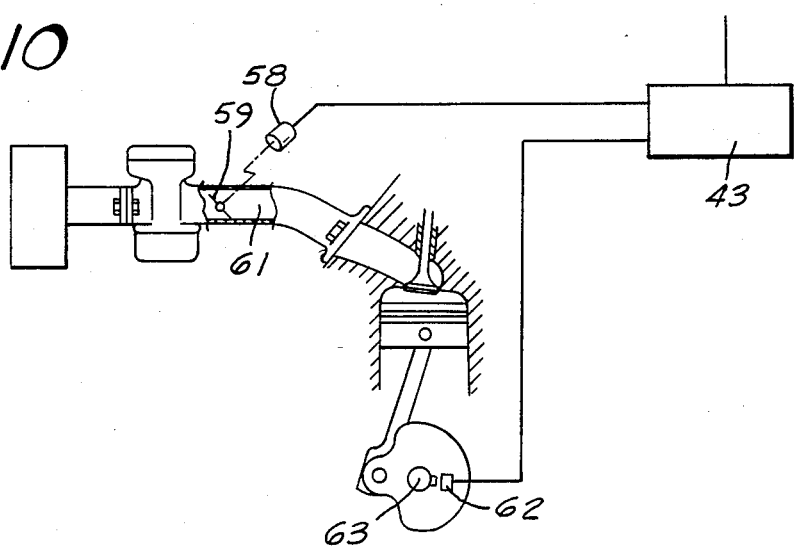
FIG. 7 is a diagrammatic view showing another modification.

In the modification of FIG. 7, the intake of air is detected by both signals of an opening sensor 58 for detecting the extent of opening of the throttle valve 59 placed in the intake passage 61 of the engine, together with the output signal of a revolution sensor 62 which counts the revolutions of the engine crankshaft 63.

Figure 8:
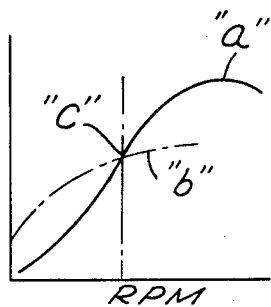
FIG. 8 is a diagram showing the output characteristic when the control means are operative, and inoperative.

In operation, when the engine is decelerated gradually to a predetermined condition in which its air intake is relatively small, this condition is detected by the air flow meter or by both of the opening sensor 58 and the revolution sensor 62, with the signals therefrom acting on the control 43. In this case, change in the output characteristic is as shown in FIG. 8, for instance: "a" in the figure shows the output characteristic curve when control means 43 is inoperative, and the RPM not higher than the intersection point "c". "b" shows such curve when the control means 43 is operative, and the RPM is not higher than that indicated by the intersection point "c" of curve "a" and curve "b". The control means 43 then controls opening of the valves to improve the output characteristic. Furthermore, when the engine is partly loaded, the RPM at the intersection point "c" is different, though not shown, similarly improving the output characteristic.

Figure 9:
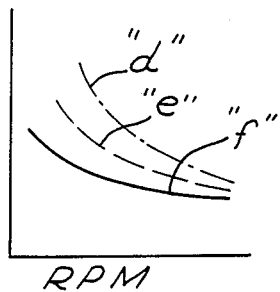
FIG. 9 is a chart showing operation characteristics.
Figure 11:
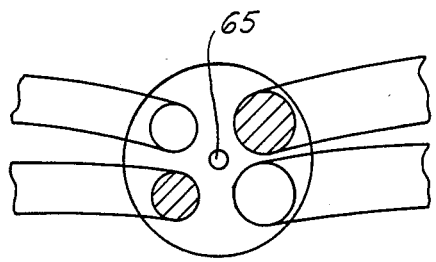
FIG. 11 is a diagrammatic plan view showing a modification of a cylinder having two intake valves and two exhaust valves.

FIG. 9 shows variations in engine RPM during idling. Curve "d" shows conventional action where two intake valves and two exhaust valves per cylinder all operate in conventional manner. Curve "e" shows the relationship where the respective adjacent intake valve and exhaust valve facing each other are caused to rest. Curve "f" shows the relationship where the respective intake and exhaust valves biased from each other, as shown in FIG. 11, are made to rest, thus showing that idling including the low loading range is stabilized.

Figure 10:
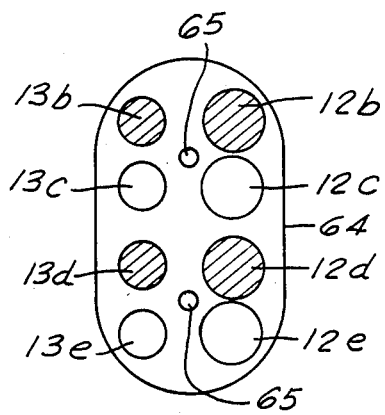
FIG. 10 is a diagrammatic plan view of an engine having an oblong cylinder provided with two pairs of intake valves and two pairs of exhaust valves.

In FIG. 10, the oblong cylinder 64 is provided with four intake valves 12b, 12c, 12d and 12e and is also provided with four exhaust valves 13b, 13c, 13d and 13e. Two spark plugs 65 are also provided. The two pairs of valves 12b-13b and 12d-13d are hatched in the drawing to indicated that they have been rendered inoperative by means of the mechanisms shown in FIGS. 5 and 6. Intake valves 12c-12e and the exhaust valves 13c-13e remain in operation by conventional mechanism. For higher speeds of the engine, the hatched valves also become operative so that four intake valves and four exhaust valves are all in action.

In FIGS. 11, 12, 13, 14, 15, 16, 17 and 18, intake valves are located at right sides along each central axes of the cylinders on which the spark plugs 65 are arranged and exhaust valves are located at left sides of the cylinders.

Figure 12:
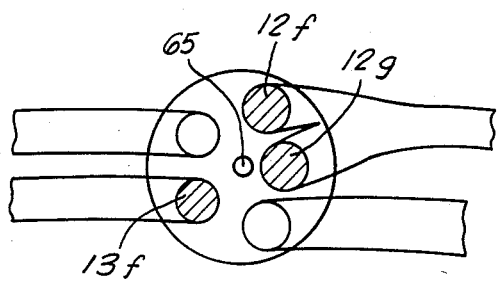
FIG. 12 is a diagrammatic plan view of a cylinder having three intake valves and two exhaust valves.
Figure 13:
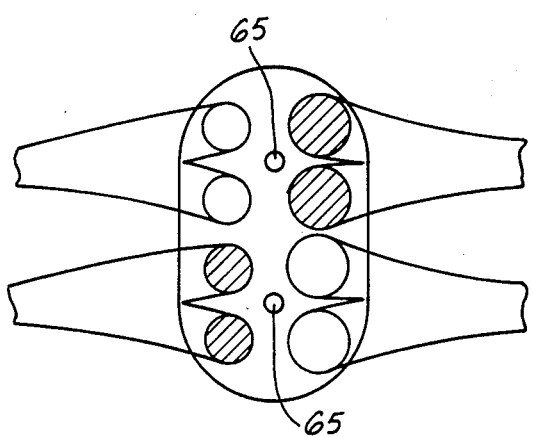
FIGS. 13, 14, 15, 16, 17 and 18 are diagrammatic plan views of oblong cylinders having various arrangements of intake valves and exhaust valves.
Figure 14:
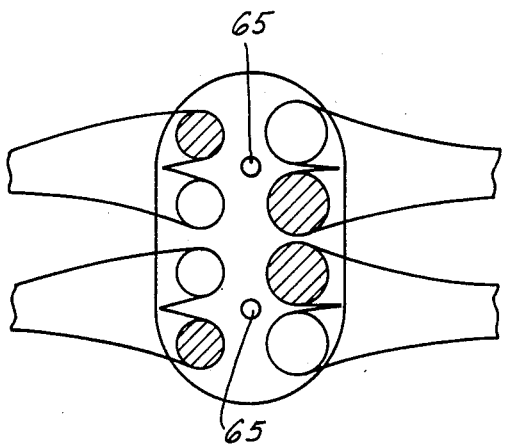
Figure 15:
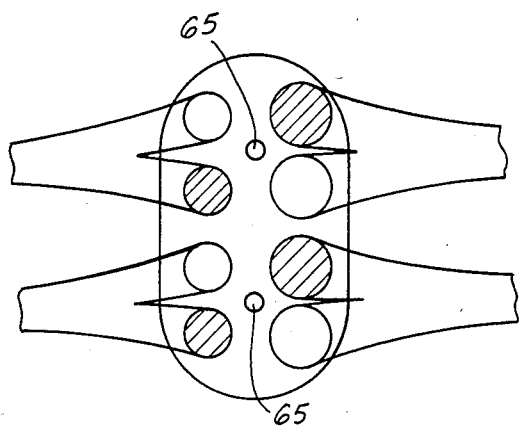
Figure 16:
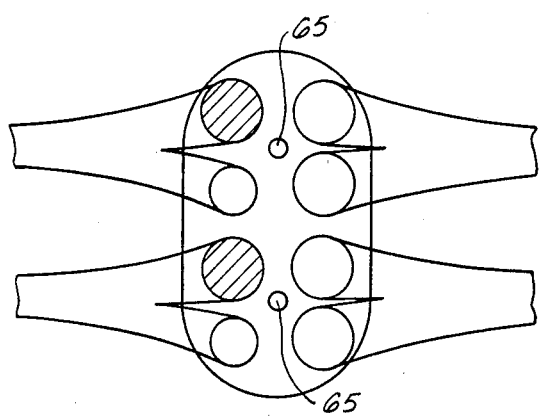

In FIG. 12, the hatched valves are those which can be rendered inoperative. It is to be noted that there are two of such intake valves 12f and 12g and only one of such exhaust valves, 13f.

Figure 17:
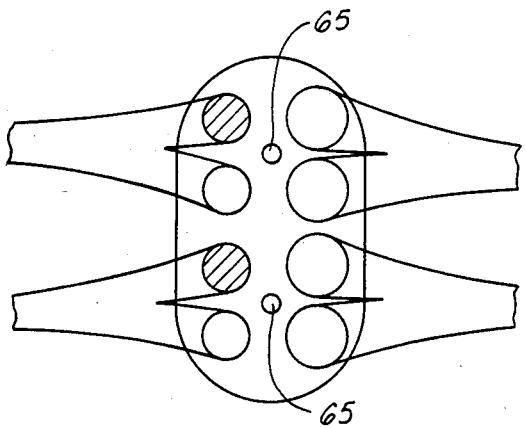
Figure 18:
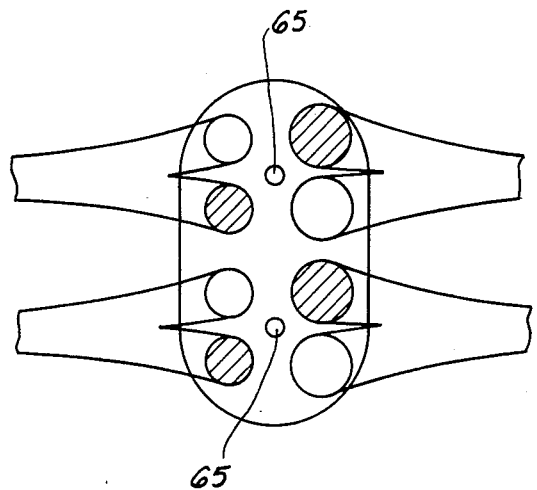

FIGS. 13, 14, 15, 16, 17 and 18 show oblong cylinders each with four intake valves and four exhaust valves and in which the valves which can be rendered inoperative are not paired with another valve in face-to-face relationship, which latter valve can also be rendered inoperative. In each figure the valves which can be rendered inoperative are shown by hatched lines. The arrangement shown in FIG. 16 differs from the others in that only two of the exhaust valves can be rendered inoperative, and these two have a larger opening area than the other two exhaust valves. In FIG. 17, the two exhaust valves which can be rendered inoperative are the same size as the other two exhaust valves. The valve arrangements as shown in FIGS. 13-18 employ valves which are biased in location, thereby eliminating generation of deviated flow in the combustion chamber and improving generation of swirl in said chamber. The effect is to promote stable idling.

Having fully described our invention, it is to be understood that we are not to be limited to the details herein set forth but that our invention is of the full scope of the appended claims.

We claim:

1. An internal combustion engine having a cylinder and a piston slidable in the cylinder, comprising
   at least one intake passage in communication with the cylinder, each said intake passage having an intake valve for controlling communication with the cylinder;
   a plurality of exhaust passages in communication with the cylinder, each said exhaust passage having an exhaust valve for controlling communication with the cylinder; and
   means for opening and closing said intake and exhaust valves, said means including disabling means for maintaining less than all said exhaust valves in a closed position through a complete exhaust cycle in response to an operating condition of the engine.

2. An internal combustion engine having a cylinder and a piston slidable in the cylinder, comprising
   at least one intake passage in communication with the cylinder, each said intake passage having an intake valve for controlling communication with the cylinder;
   a plurality of exhaust passages in communication with the cylinder, each said exhaust passage having an exhaust valve for controlling communication with the cylinder; and
   means for opening and closing said intake and exhaust valves, said means including disabling means for maintaining less than all said exhaust valves in a closed position through a complete exhaust cycle in response to a decrease in speed of the engine below a predetermined level.

3. An internal combustion engine having a cylinder and a piston slidable in the cylinder, comprising two intake passages in communication with the cylinder, each said intake passage having an intake valve for controlling communication with the cylinder;

two exhaust passages in communication with the cylinder, each said exhaust passage having an exhaust valve for controlling communication with the cylinder; and means for opening and closing said intake and exhaust valves, said means including disabling means for maintaining only one exhaust valve in a closed position through a complete exhaust cycle in response to an operating condition of the engine, including an actuator coupled with said disabling means to activate said disabling means upon decrease in speed of the engine below a predetermined level.

4. The internal combustion engine of claim 3 wherein said two exhaust passages are joined at a distance from said exhaust valves.

5. An internal combustion engine having a cylinder and a piston slidable in the cylinder, comprising at least one intake passage in communication with the cylinder, each said intake passage having an intake valve for controlling communication with the cylinder;

a plurality of exhaust passages in communication with the cylinder, each said exhaust passage having an exhaust valve for controlling communication with the cylinder;

a valve spring for each said intake and exhaust valve, positioned and arranged for biasing said valves in the closed position;

valve actuating means including rotary cam lobes for operating said intake and exhaust valves, at least one of said valve actuating means including disabling means for maintaining less than all said exhaust valves in a closed position for a complete exhaust cycle and each including a rocker arm engaged by one of said cam lobes, each said rocker arm having a fulcrum a slidable member having a pivotal means engaging and positioning said fulcrum in response to hydraulic pressure, said disabling means having a means for reducing said hydraulic pressure to permit movement of said member by said rocker arm instead of causing movement of said one exhaust valve against the force of its said closing spring, and means for actuating said disabling means upon decrease in speed of the engine below a predetermined level.

6. The combination set forth in claim 5 in which said fulcrum is at one end of said rocker arm.

7. An internal combustion engine having a cylinder and a piston slidable in the cylinder, comprising two intake passages in communication with the cylinder, each said intake passage having an intake valve for controlling communication with the cylinder;

two exhaust passages in communication with the cylinder, each said exhaust passage having an exhaust valve for controlling communication with the cylinder;

valve springs, each of said intake and exhaust valves having a closing valve spring; and means including rotary cam lobes for operating said intake and exhaust valves, at least one of said exhaust valves being operated by a rocker arm engaged by one of said cam lobes, said rocker arm having a fulcrum a slidable member having a projection engaging and positioning said fulcrum in response to hydraulic pressure, disabling means for maintaining only one exhaust valve in a closed position for a complete exhaust cycle and for reducing said hydraulic pressure to permit movement of said member by said rocker arm instead of causing movement of said one exhaust valve against the force of its closing spring, and means for actuating said disabling means upon decrease in speed of the engine below a predetermined level.

8. An internal combustion engine having a cylinder and a piston slidable in the cylinder, comprising at least one intake passage in communication with said cylinder, a plurality of exhaust passages in communication with the cylinder, each said exhaust passage having an exhaust valve for controlling communication with the cylinders and means for maintaining less than all said exhaust valves in a closed position for a complete exhaust cycle including;

a rotary cam lobe;

a rocker arm engaged by said rotary cam lobe;

a retractable member held in position relative to the engine in response to hydraulic pressure;

fulcrum means connecting said rocker arm to said member;

and, solenoid operated valve means for reducing said hydraulic pressure to permit retraction of said member by said rocker arm to an inoperative position, only one said exhaust valve being coupled with said rocker arm.

9. An internal combustion engine having a cylinder and a piston slidable in the cylinder, comprising two intake passages in communication with the cylinder, each said intake passage having an intake valve for controlling communication with the cylinder;

two exhaust passages in communication with the cylinder, each said exhaust passage having an exhaust valve for controlling communication with the cylinder; and means for opening and closing said intake and exhaust valves, said means including disabling means for maintaining only one said exhaust valves and only one said intake valves in a closed position for a complete exhaust and intake cycle, respectively, in response to an operating condition of the engine, said one exhaust valve being the most distant of said exhaust valves from said one intake valve.

10. An internal combustion engine having a cylinder and a piston slidable in the cylinder, comprising at least one intake passage in communication with the cylinder, each said intake passage having an intake valve for controlling communication with the cylinder, a plurality of exhaust passages in communication with the cylinder, each said exhaust passage having an exhaust valve for controlling communication with the cylinder, each said intake and exhaust valve including a valve closing spring;

means for opening said intake and exhaust valves, said means including a rocker arm for at least one said exhaust valve, a rotary cam lobe engaging said rocker arm, said rocker arm having a fulcrum;

disabling means for maintaining less than all of said exhaust valves in a closed position for a complete exhaust cycle in response to an operating condition of the engine, said disabling means including a member having a pivotal means for support of said fulcrum, said member being supported by a spring weaker than said respective valve closing spring and a hydraulically actuated piston, said hydraulically actuated piston being selectively retractable to permit movement of said member by said rocker arm against said weaker spring instead of causing movement of the respective valve against the force of said valve closing spring and means for actuating said disabling means upon decrease in speed of the engine below a predetermined level.

* * * * *

UNITED STATES PATENT AND TRADEMARK OFFICE
CERTIFICATE OF CORRECTION

PATENT NO. : 4,587,936
DATED : May 13, 1986
INVENTOR(S) : M. Matsuura & Y. Makano It is certified that error appears in the above-identified patent and that said Letters Patent are hereby corrected as shown below:

Column 3, line 52, after "Curve" change "c" to --"e"--

Column 5, line 40, after "fulcrum" insert a --,--

Signed and Sealed this

Twenty-fifth Day of August, 1987

Attest:

DONALD J. QUIGG

Attesting Officer

Commissioner of Patents and Trademarks